US012783127B2

(12) United States Patent
Longo et al.

(10) Patent No.: US 12,783,127 B2
(45) **Date of Patent: *Nov. 3, 2026**

(54) QUALITY OF SERVICE MANAGEMENT MECHANISM

(71) Applicant: NetApp, Inc., San Jose, CA (US)

(72) Inventors: Austino Longo, Lafayette, CO (US); Tyler Cady, Denver, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,447

(22) Filed: Jan. 8, 2025

(65) Prior Publication Data

US 2025/0224878 A1 Jul. 10, 2025

Related U.S. Application Data

(63) Continuation of application No. 17/218,217, filed on Mar. 31, 2021, now Pat. No. 12,210,747.

(51) Int. Cl.
*G06F 12/00* (2006.01)
*G06F 3/06* (2006.01)

(52) U.S. Cl.
CPC .......... *G06F 3/0613* (2013.01); *G06F 3/0611* (2013.01); *G06F 3/0629* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,487,562 B1 | 11/2002 | Mason, Jr. et al. | |
| 8,046,366 B1 | 10/2011 | Perrin et al. | |
| 8,213,453 B1 | 7/2012 | Voruganti et al. | |
| 12,210,747 B2 * | 1/2025 | Longo .................. | G06F 3/0611 |
| 2011/0191759 A1 | 8/2011 | Andrade et al. | |
| 2012/0137005 A1 | 5/2012 | Behrendt et al. | |
| 2013/0060933 A1 | 3/2013 | Tung et al. | |
| 2014/0164048 A1 | 6/2014 | Bourdaillet et al. | |
| 2015/0281999 A1 | 10/2015 | Zhu et al. | |
| 2016/0170794 A1 | 6/2016 | Bairavasundaram et al. | |
| 2018/0098265 A1 | 4/2018 | Tomici et al. | |
| 2020/0228626 A1 | 7/2020 | Bernat et al. | |

(Continued)

OTHER PUBLICATIONS

Final Office Action mailed Nov. 16, 2022 for U.S. Appl. No. 17/218,217, filed Mar. 31, 2021, 18 pages.

(Continued)

*Primary Examiner* — Daniel D Tsui
(74) *Attorney, Agent, or Firm* — Jaffery Watson Hamilton & DeSanctis LLP

(57) ABSTRACT

A system is described. The system includes a processing resource and a non-transitory computer-readable medium, coupled to the processing resource, having stored therein instructions that when executed by the processing resource cause the processing resource to receive a plurality of quality of service (QoS) parameters and client preferences from a client device and manage a QoS policy based on a plurality of QoS objectives included in the received QoS parameters, wherein the plurality of QoS objectives comprise input output operations per second (IOPS), throughput and latency.

20 Claims, 5 Drawing Sheets

(56) References Cited

U.S. PATENT DOCUMENTS

| | | | |
|---|---|---|---|
| 2021/0037087 | A1 | 2/2021 | Liu et al. |
| 2021/0349657 | A1 | 11/2021 | Darji |

OTHER PUBLICATIONS

Final Office Action mailed Sep. 15, 2023 for U.S. Appl. No. 17/218,217, filed Mar. 31, 2021, 21 pages.
Non-Final Office Action mailed on Apr. 14, 2023 for U.S. Appl. No. 17/218,217.
Notice of Allowance mailed on Oct. 4, 2024 for U.S. Appl. No. 17/218,217.
Notice of Allowance mailed on Sep. 18, 2024 for U.S. Appl. No. 17/218,217, filed Mar. 31, 2021, 13 pages.

* cited by examiner

QUALITY OF SERVICE MANAGEMENT MECHANISM

CROSS-REFERENCE TO RELATED APPLICATIONS

This application is a continuation of U.S. patent application Ser. No. 17/218,217, filed Mar. 31, 2021, the contents of which are hereby incorporated by reference in their entirety for all purposes.

BACKGROUND

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volume server as an interface to the volume allows the freedom to distribute the data evenly over the one or more volumes. The even distribution of data can be beneficial in terms of volume and system performance.

Read and write requests of the client are typically transformed into read and/or write input-output operations (IOPS). For example, a file read request by a client can be transformed into one or more read IOPS of some size. Similarly, a file write request by the client can be transformed into one or more write IOPS.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
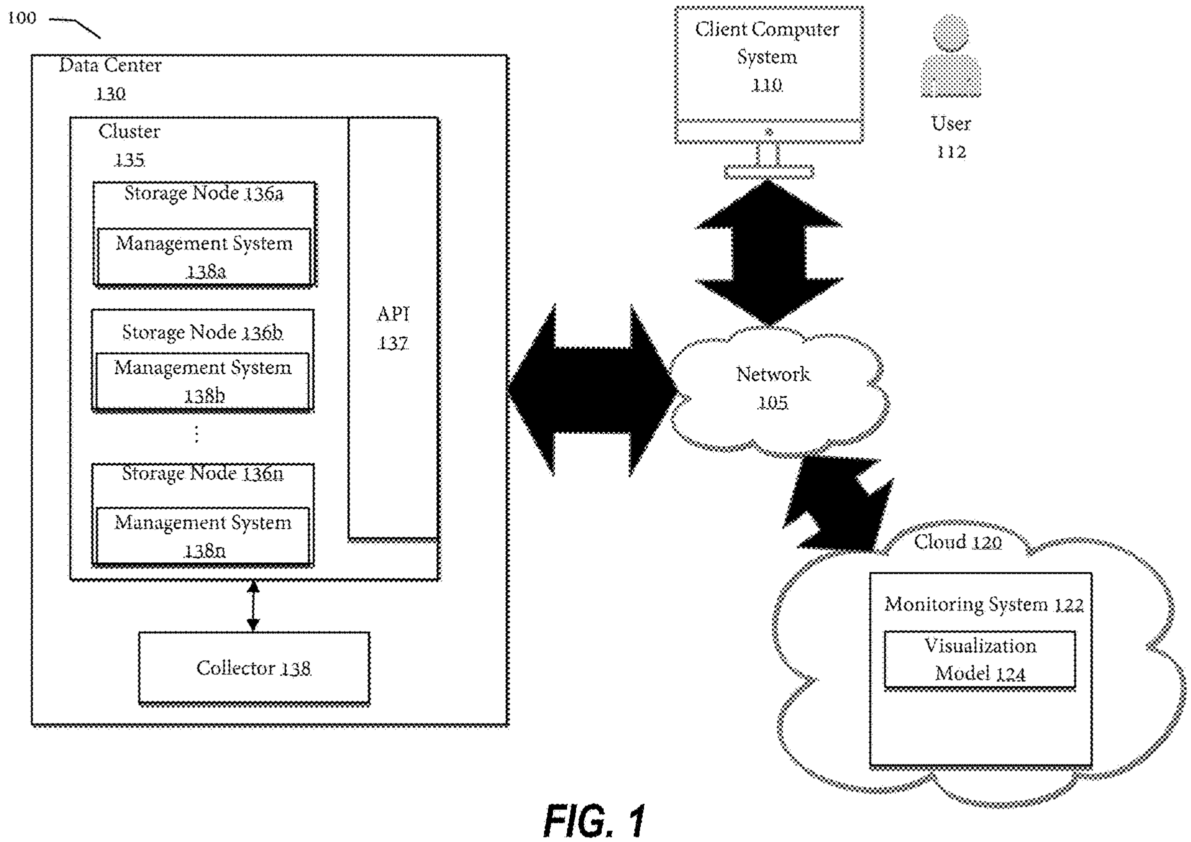
FIG. 1 is a block diagram illustrating an environment in which various embodiments may be implemented.

IOPS is a standard way of measuring the performance of a storage system by providing an indication as to a quantity of requests (e.g., read and write request operations) that are made per second. To estimate IOPS required by a workload on a volume, storage administrators measure the IOPS over a time interval and selects the highest value measured during the time interval. A storage system experiences a sluggish performance in instances in which insufficient IOPS are provided to a workload. Conversely, the storage system will have unused capacity if the provisioned IOPS are higher than what the workload actually needs.

Storage Quality of Service (QoS) policies define the IOPS associated with a volume and ensures that they are met. Thus, QoS parameters are variables that define desired QoS bounds for a client using the storage system. QoS policies also provide consistent performance to workloads, and are using the following parameters: Min-IOPS; Max-IOPS; and Burst-IOPS. Min-IOPS is defined as a minimum quantity of IOPS that will be provided by a policy (e.g., QoS reservation). Max-IOPS is defined as a maximum quantity IOPS that will be limited by a policy (e.g., QoS limit). Burst-IOPS is defined as a quantity of IOPS available for a temporary period based on unused IOPS (e.g., burst credit).

Currently, stored volumes may be configured according to a single QoS objective (e.g., IOPS). However, configuration using a single objective limits client QoS options. According to one embodiment, a QoS management mechanism is provided to receive QoS parameters and one or more client preferences and manage QoS policies based on a plurality of QoS objectives included in the received QoS parameters. In such an embodiment, the management mechanism may receive IOPS, throughput and latency parameters, and manages QoS adjustments according to objectives provided by the IOPS, throughput and latency parameters. In a further embodiment, the QoS management mechanism manages the adjustments using the client preferences.

As used herein, a storage workload is defined as any operation (e.g., data replication, deduplication, data compression etc.) that requires I/O data. Telemetry data may be defined as performance, configuration and other system data of a monitored system. Telemetry data may refer to one data point or a range of data points. Non-limiting examples of telemetry data for a distributed storage system include latency, utilization, a number of IOPS, Quality of Service (QoS) settings, or any other performance related information.

Throughput may be defined as a rate of successful message delivery over a communication channel, and is usually measured in bits per second (bit/s or bps). However in other embodiments, throughput may be measured in data packets per second (p/s or pps) or data packets per time slot. Latency (or delay) is a measure (e.g., in milliseconds (ms)) of an elapsed time between a sending node sending a packet and a receiving node receiving that packet.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

FIG. 1 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client computer system (or client) 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a client computer system 110, and a user 112. The data center 130, the cloud 120, and the client computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is built, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135) and a collector 139. Those of ordinary skill in the art will appreciate additional IT infrastructure would typically be part of the data center 130; however, discussion of such additional IT infrastructure is unnecessary to the understanding of the various embodiments described herein.

Turning now to the cluster 135, it includes multiple storage nodes 136*a-n* and an Application Programming Interface (API) 137. In the context of the present example, the multiple storage nodes 136*a-n* are organized as a cluster and provide a distributed storage architecture to service storage requests issued by one or more clients (not shown) of the cluster. The data served by the storage nodes 136*a-n* may be distributed across multiple storage units embodied as persistent storage devices, including but not limited to hard disk drives, solid state drives, flash memory systems, or other storage devices. A non-limiting example of a storage node 136 is described in further detail below with reference to FIG. 2.

The API 137 may provide an interface through which the cluster 135 is configured and/or queried by external actors (e.g., the collector 139, the client computer system 110, and a cloud-based, centralized monitoring system (e.g., monitoring system 122). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In various examples described herein, the collector 139 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Y seconds). The collector 139 may locally process and/or aggregate the collected telemetry data over a period of time by data point values and/or by ranges of data point values and provide frequency information regarding the aggregated telemetry data retrieved from the cluster 135 to the centralized monitoring system.

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system (e.g., monitoring system 122). The monitoring system 122 may periodically receive monitored information, including raw and/or processed telemetry data (e.g., frequency distributions representing aggregated telemetry data over time) of multiple clusters (e.g., cluster 135) from multiple distributed collectors (e.g., collector 139) operable within respective data centers (e.g., data center 130) of one or more customers of the managed service provider. Depending upon the particular implementation, the monitored information may be pushed from the collector 139 or pulled from the collector 139 in accordance with a monitoring schedule or responsive to an event (e.g., a request issued by user 112 to the monitoring system 122).

As noted above, the monitored information may represent hundreds of thousands of observations (samples) of telemetry data over a period of time in which the vast majority of telemetry data may represent normal operating conditions, but a small number of occurrences (e.g., telemetry data exceeding certain thresholds) may be indicative of events of significance (e.g., an abnormal condition, imminent need for increased storage capacity, imminent failure of a storage node 136, or the like).

In one embodiment, the monitoring system 122 includes a visualization model 124 to facilitate visualization of the monitored information. Depending upon the particular implementation, some aspects of the visualization model (e.g., determination and/or configuration of tuning parameters) may be performed and/or applied by the monitoring system 122 and other aspects of the visualization model may be performed and/or applied by the client computer system 110, for example, by a web browser running on the client computer system 110 performing dynamic code execution of code (e.g., JavaScript) delivered to the browser and embedded within a web page (e.g., a Hypertext Markup Language (HTML) file) by or on behalf of the monitoring system 122.

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

Figure 2:
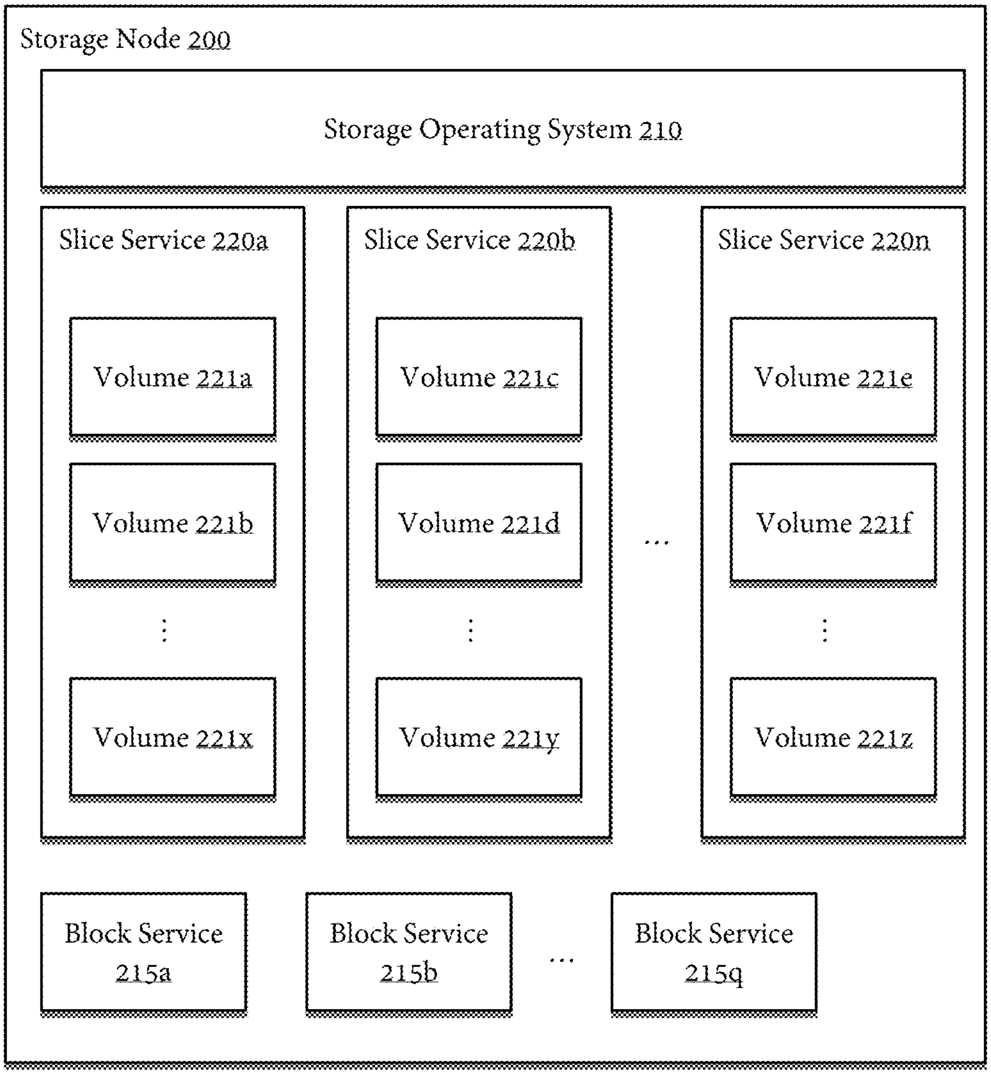
FIG. 2 is a block diagram illustrating a storage node in accordance with an embodiment of the present disclosure.

FIG. 2 is a block diagram illustrating a storage node 200 in accordance with an embodiment of the present disclosure. Storage node 200 represents a non-limiting example of storage nodes 136*a-n*. In the context of the present example, storage node 200 includes a storage operating system 210, one or more slice services 220*a-n*, and one or more block services 215*a-q*. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

Each slice service 220 may include one or more volumes (e.g., volumes 221*a-x*, volumes 221*c-y*, and volumes 221*e-z*). Client systems (not shown) associated with an enterprise may store data to one or more volumes, retrieve data from one or more volumes, and/or modify data stored on one or more volumes.

The slice services 220*a-n* and/or the client system may break data into data blocks. Block services 215*a-q* and slice services 220*a-n* may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220*a-n* may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215*a-q* and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a collector module (e.g., collector 139) may poll an API (e.g., API 137) of a distributed storage system (e.g., cluster 135) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136*a-n*), individual or groups of volumes 221, individual or groups of slice services 220, and/or individual or groups of block services 215.

According to one embodiment, each storage node 136 within cluster 135 includes a management system 138 (e.g., management system 138*a*-138*n*) that is implemented to manage and configure various elements of environment 100. In such an embodiment, a management system 138 receives QoS parameters from a client computer system 110 (e.g., via visualization model 124). In a further embodiment, management system 138 manages QoS policies based on a plurality of QoS objectives included in the received QoS parameters. In such an embodiment, the QoS parameters comprise IOPS parameters (e.g., Min-IOPS; Max-IOPS; and Burst-IOPS parameters), throughput parameters and latency parameters (e.g., Min-Throughput and Max-Throughput and Min-Latency and Max-Latency). Although disclosed as being included in storage nodes 136, other embodiments may host management system 138 within each slice service 220 shown in FIG. 2.

Figure 3:
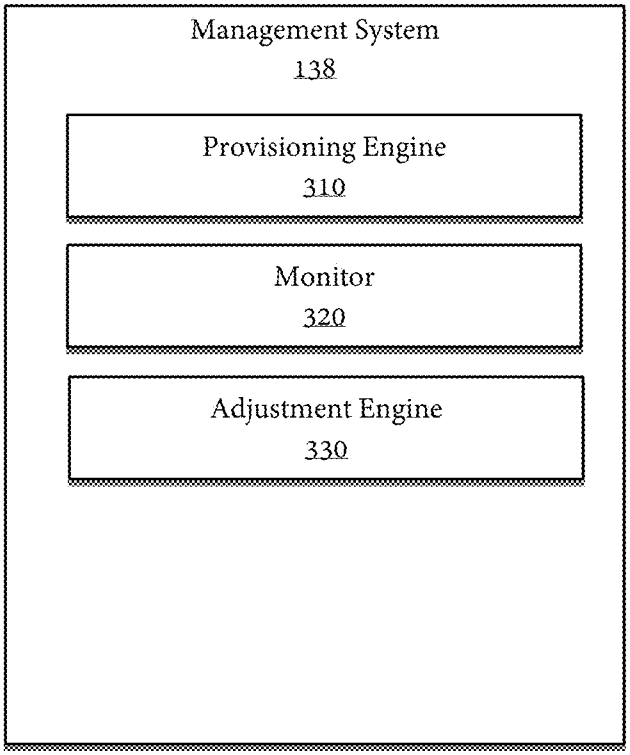
FIG. 3 illustrates one embodiment of a management system.

FIG. 3 illustrates one embodiment of management system 138. As shown in FIG. 3, management system 138 includes provisioning engine 310, monitor 320 and adjustment engine 330. Provisioning engine 310 provisions a QoS policy based on QoS parameters received from a client 110. For example, the received QoS parameters may include IOPS parameters providing for Min-IOPS, Max-IOPS and Burst-IOPS of 50, 15000 and 20000, respectively; throughput parameters not to exceed 100 mb/s or drop below 20 mb/s; and a latency parameter not to exceed 5 ms. Once received, provisioning engine 310 provisions the QoS policy by setting the received QoS parameters as QoS objectives.

According to one embodiment, provisioning engine 310 also receives client preferences from the client 110. In this embodiment, the client preferences may include one or more preference rules that determine one or more objective preferences between a plurality of QoS objectives (e.g., IOPS, throughput and latency objectives) upon the occurrence of a conflict between defined QoS parameters during workload execution. For example, a rule may indicate that the max latency parameter may be exceeded as long as the actual IOPS do not fall below the Min-IOPS parameter. Additionally, a rule may ensure that minimum throughput. Further, a rule may guarantee that IOs never exceed a max latency value, and disregard any cap on IOPS or throughput (e.g., let a volume go as fast as it wants, and only throttle the system if that volume's IO latencies start violating that max latency threshold). In addition to the above, a rule may further allow for warning/error/critical latency thresholds that act to progressively throttle the system as this volume's latencies cross each threshold.

Monitor 320 monitors real-time volume performance to determine the utilization by client 110. According to one embodiment, monitor 320 polls telemetry data associated with the client at predetermined intervals (e.g., 500 ms) to retrieve performance values associated with the QoS objectives (e.g., actual IOPS values, throughput values and latency values). In a further embodiment, monitor 320 determines whether one or more of the retrieved performance values exceed the QoS parameters provided in the client 110 policy.

Adjustment engine 330 performs one or more QoS adjustments upon a determination that one or more of the retrieved performance values exceed the QoS parameters. In one embodiment, adjustment engine 330 may make one or more adjustments to enable compliance with the QoS parameters. In a further embodiment, a QoS adjustment is performed by making global volume adjustments. For example, adjustment engine 330 may reduce volumes that are contending with the same resources as client 110. Additionally, adjustment engine 330 may reduce allowable IOPS for other clients during a subsequent interval in order to enhance the performance for the client 110.

In a further embodiment, adjustment engine 330, prior to making a QoS adjustment, determines whether an adjustment would result in a conflict between two or more of the QoS parameter objectives (e.g., IOPS, throughput and latency parameters). In such an embodiment, adjustment engine 330 examines preference rules in the client preferences to determine an objective preference to an facilitate adjustment corresponding with the preference rules. Thus, adjustment engine 330 may perform an adjustment that disregards a policy objective in favor of another. For example, the adjustment performed by adjustment engine 330 may result in the max latency parameter being exceeded, while preventing the actual IOPS for the client 110 from falling below the Min-IOPS parameter. As discussed above, the functionality of monitor 320 and/or adjustment engine may be hosted within each slice service 220 (e.g., slice service 220*a*-220*b*).

Figure 4:
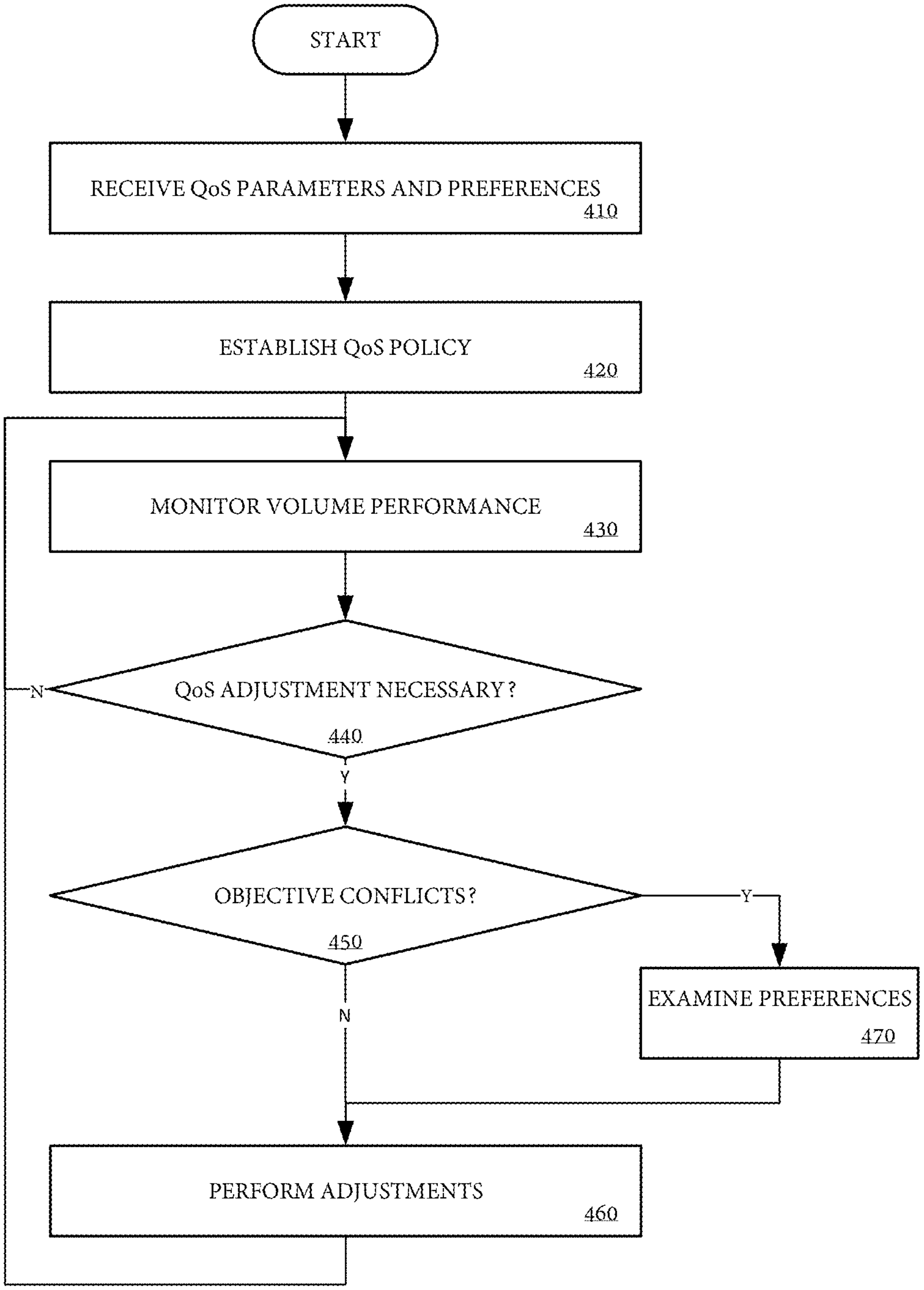
FIG. 4 is a flow diagram illustrating one embodiment of a QoS management process.

FIG. 4 is a flow diagram illustrating one embodiment of a QoS management process. At processing block 410, QoS parameters and client preferences are received via a user interface, such as visualization model. As discussed above, the parameters comprise IOPS, throughput and latency parameters. At processing block 420, a QoS policy is established based on the received parameters. As mentioned above, the QoS policy includes IOPS, throughput and latency objectives established by the respective parameters.

At processing block 430, volume performance is monitored during execution of workload associated with the client 110. As discussed above, volume performance is monitored by polling the telemetry data at predetermined intervals to retrieve actual IOPS values, throughput values and latency values, among other metrics (e.g., cache fullness and cluster fullness). At decision block 440, a determination is made as to whether a QoS adjustment is necessary (e.g., whether one or more of the retrieved performance values exceed the QoS parameters). If not, control is returned to processing block 430 where the volume performance continues to be monitored.

Upon a determination at decision block 440 that a QoS adjustment is necessary, a subsequent determination is made as to whether the adjustment would cause a conflict between one or more of the QoS policy parameters, decision block 450. If not, the necessary QoS adjustments are performed to comply with the QoS policy objectives, processing block 460. As discussed above, global volume adjustments may be performed by reducing volumes that are contending with the same resources as client 110. Upon a determination at decision block 450 that there is a conflict, the preference rules in the client preferences are examined to determine an objective preference, processing block 470, prior to performing a QoS adjustment at processing block 460 that complies with the objective preference.

Figure 5:
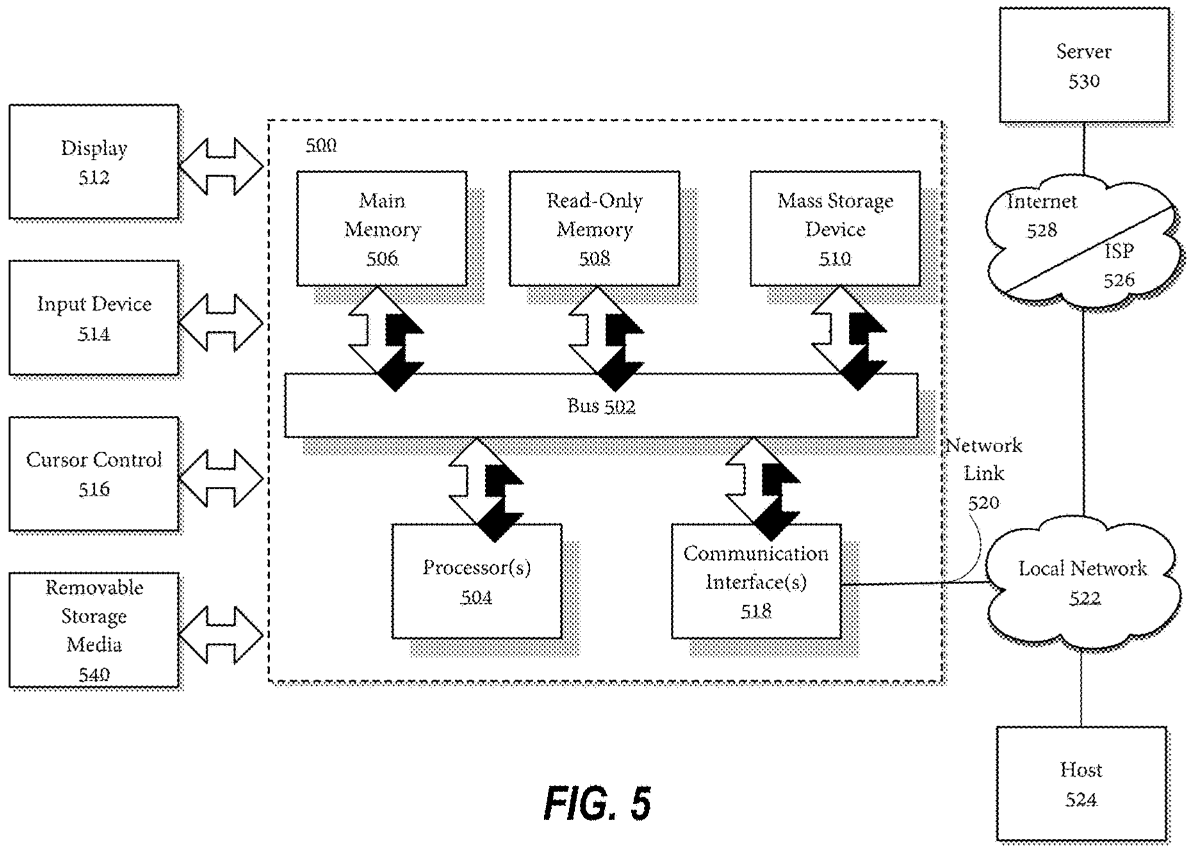
FIG. 5 illustrates an example computer system in which or with which embodiments of the present disclosure may be utilized.

FIG. 5 is a block diagram that illustrates a computer system 500 in which or with which an embodiment of the present disclosure may be implemented. Computer system 500 may be representative of all or a portion of the computing resources associated with a storage node (e.g., storage node 136), a collector (e.g., collector 139), a monitoring system (e.g., monitoring system 122) or an administrative workstation (e.g., client computer system 110). Notably, components of computer system 500 described herein are meant only to exemplify various possibilities. In no way should example computer system 500 limit the scope of the present disclosure. In the context of the present example, computer system 500 includes a bus 502 or other communication mechanism for communicating information, and a processing resource (e.g., a hardware processor 504) coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, e.g., a magnetic disk, optical disk or flash disk (made of flash memory chips), is provided and coupled to bus 502 for storing information and instructions.

Computer system 500 may be coupled via bus 502 to a display 512, e.g., a cathode ray tube (CRT), Liquid Crystal Display (LCD), Organic Light-Emitting Diode Display (OLED), Digital Light Processing Display (DLP) or the like, for displaying information to a computer user. An input device 514, including alphanumeric and other keys, is coupled to bus 502 for communicating information and command selections to processor 504. Another type of user input device is cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Removable storage media 540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 510. Volatile media includes dynamic memory, such as main memory 506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method performed by one or more processing resources of one or more computer systems, the method comprising:

monitoring QoS performance values included in telemetry data during execution of a workload to determine whether a performance metric is violated;

determining whether a QoS adjustment would result in a conflict between a plurality of QoS objectives upon determining that the performance metric is violated; and automatically adjusting, upon determining that the QoS adjustment would result in the conflict, a QoS policy based on a preference rule that provides an objective preference between the plurality of QoS objectives.

2. The method of claim 1, further comprising examining the preference rule to select between a first QoS object and a second QoS objective.

3. The method of claim 2, wherein the selecting between the first QoS objective and the second QoS objective comprises disregarding the second QoS objective in favor of the first QoS objective.

4. The method of claim 2, wherein the preference rule indicates that first QoS objective may not exceed a maximum latency parameter while disregarding the second QoS objective and a third QoS objective.

5. The method of claim 2, further comprising performing one or more QoS adjustments upon determining that the QoS adjustment would not result in the conflict between the first QoS objective and the second QoS objective.

6. The method of claim 2, wherein the performance rule indicates that the first QoS objective may be exceeded as long as the second QoS objective does not fall below a threshold.

7. The method of claim 2, wherein the performance rule comprises a plurality of thresholds that reduces a maximum parameter a predetermined amount upon determining that the first QoS objective has exceeded a threshold.

8. A non-transitory computer-readable storage medium embodying a set of instructions, which when executed by a processing resource cause the processing resource to:

monitor QoS performance values included in telemetry data during execution of a workload to determine whether a performance metric is violated;

determine whether a QoS adjustment would result in a conflict between a plurality of QoS objectives upon determining that the performance metric is violated; and automatically adjust, upon determining that the QoS adjustment would result in the conflict, a QoS policy based on a preference rule that provides an objective preference between the plurality of QoS objectives.

9. The computer-readable storage medium of claim 8, embodying a set of instructions, which when executed by a processing resource further cause the processing resource to examine the preference rule to select between a first QoS object and a second QoS objective.

10. The computer-readable storage medium of claim 9, wherein the selecting between the first QoS objective and the second QoS objective comprises disregarding the second QoS objective in favor of the first QoS objective.

11. The computer-readable storage medium of claim 9, wherein the preference rule indicates that first QoS objective may not exceed a maximum latency parameter while disregarding the second QoS objective and a third QoS objective.

12. The computer-readable storage medium of claim 9, bodying a set of instructions, which when executed by a processing resource further cause the processing resource to perform one or more QoS adjustments upon determining that the QoS adjustment would not result in the conflict between the first QoS objective and the second QoS objective.

13. The computer-readable storage medium of claim 9, wherein the performance rule indicates that the first QoS objective may be exceeded as long as the second QoS objective does not fall below a threshold.

14. The computer-readable storage medium of claim 9, wherein the performance rule comprises a plurality of thresholds that reduces a maximum parameter a predetermined amount upon determining that the first QoS objective has exceeded a threshold.

15. A system comprising:

a plurality of storage nodes executing client workloads; and a monitoring system that receives real-time QoS parameters associated with the workloads and manages QoS policies based on a plurality of QoS objectives by:

determining whether a QoS adjustment would result in a conflict between the plurality of QoS objectives upon determining that a performance metric is violated; and automatically adjusting, upon determining that the QoS adjustment would result in the conflict, a QoS policy based on a preference rule that provides an objective preference between a plurality of QoS objectives.

16. The system of claim 15, wherein the monitoring system further manages QoS policies based on the plurality of QoS objectives by examining the preference rule to select between a first QoS object and a second QoS objective.

17. The system of claim 16, wherein the selecting between the first QoS objective and the second QoS objective comprises disregarding the second QoS objective in favor of the first QoS objective.

18. The system of claim 16, wherein the preference rule indicates that first QoS objective may not exceed a maximum latency parameter while disregarding the second QoS objective and a third QoS objective.

19. The system of claim 16, wherein the monitoring system further manages the QoS policies based on the plurality of QoS objectives by performing one or more QoS adjustments upon determining that the QoS adjustment would not result in the conflict between the first QoS objective and the second QoS objective.

20. The system of claim 16, wherein the performance rule indicates that the first QoS objective may be exceeded as long as the second QoS objective does not fall below a threshold.

* * * * *